United States Patent [19]

Thorncraft et al.

[11] Patent Number: 4,957,338
[45] Date of Patent: Sep. 18, 1990

[54] FABRICATION OF FIBRE OPTIC COMPONENTS

[75] Inventors: David A. Thorncraft, Isabella Plains; David R. Kennedy, Kambah; Scott C. Rashleigh, Wanniassa; Timothy P. Dabbs, Eastwood, all of Australia

[73] Assignee: The Commonwealth of Australia, Australia

[21] Appl. No.: 259,118

[22] PCT Filed: Nov. 9, 1987

[86] PCT No.: PCT/AU87/00380
§ 371 Date: Sep. 12, 1988
§ 102(e) Date: Sep. 12, 1988

[87] PCT Pub. No.: WO88/03661
PCT Pub. Date: May 19, 1988

[30] Foreign Application Priority Data

Nov. 14, 1986 [AU] Australia ............... PH8981/86

[51] Int. Cl.⁵ ............................................. G02B 6/26
[52] U.S. Cl. .................................. 350/96.15; 65/4.21; 350/96.20
[58] Field of Search .................. 350/96.15, 96.20; 65/4.21, 31

[56] References Cited

U.S. PATENT DOCUMENTS

| 3,825,319 | 7/1974 | Cook | 350/96 |
|---|---|---|---|
| 4,291,940 | 9/1981 | Kawasaki et al. | 350/96.15 |
| 4,336,047 | 6/1982 | Pavlopoulos | 350/96 |
| 4,377,403 | 3/1983 | McLandrich | 65/4.21 X |
| 4,392,712 | 7/1983 | Ozeki | 350/96.16 |
| 4,400,055 | 8/1983 | Ozeki | 350/96.16 |
| 4,410,346 | 10/1983 | Aulich | 65/4.2 |
| 4,439,221 | 3/1984 | Smyth et al. | 65/31 X |
| 4,449,781 | 5/1984 | Lightstone | 350/96.15 |
| 4,536,058 | 8/1985 | Shaw | 350/96.15 |
| 4,550,974 | 11/1985 | Murphy | 350/96.15 |
| 4,565,558 | 1/1986 | Keil | 65/1 |
| 4,584,464 | 4/1986 | Myers | 219/354 |
| 4,586,784 | 5/1986 | Tremblay | 350/96.15 |
| 4,591,372 | 5/1986 | Bricheno et al. | 350/96.15 X |
| 4,612,028 | 9/1986 | Abebe et al. | 65/31 X |
| 4,687,284 | 8/1987 | Rawson et al. | 350/96.15 |
| 4,755,037 | 7/1988 | Bjornlie | 350/96.15 |
| 4,756,589 | 7/1988 | Bricheno et al. | 350/96.15 |
| 4,763,272 | 8/1988 | McLandrich | 364/468 |
| 4,765,816 | 8/1988 | Bjornlie | 65/4.2 |
| 4,798,436 | 1/1989 | Mortimore | 350/96.15 |
| 4,801,185 | 1/1989 | Bricheno | 350/96.15 |
| 4,879,454 | 11/1989 | Gerdt | 350/96.20 X |

FOREIGN PATENT DOCUMENTS 2587502 3/1987 France .

OTHER PUBLICATIONS

"Multimode Directional Coupler Development", by Thorncraft et al. 19th Australian Conference on Optical Fibre Technology, 12/2–5/85, Perth Aust.

Primary Examiner—John D. Lee
Assistant Examiner—Phan T. Heartney
Attorney, Agent, or Firm—Saidman, Sterne Kessler & Goldstein

[57] ABSTRACT

A method of fabricating a fused fibre optic coupler includes disposing two or more segments of optical fibre under longitudinal tension. The tensioned fibre segments are preheated to a temperature sufficient to soften the segments and thereby substantially relieve their tension by inelastic stretching of the segments. After the segments have cooled, the fibre segments are re-tensioned and then heated while in intimate side-by-side contact to a temperature sufficient to cause the fibre segments to fuse together.

17 Claims, 4 Drawing Sheets

4,957,338

FABRICATION OF FIBRE OPTIC COMPONENTS

FIELD OF THE INVENTION

This invention relates to the fabrication of fused fibre optic couplers, especially biconical taper couplers, and is concerned in particular with improving the control and optimum management of the fabrication process.

BACKGROUND ART

The usual technique for forming fused biconical taper fibre optic couplers entails disposing respective segments of two or more optical fibres in intimate side-by-side relationship and heating the segments to a temperature sufficient to cause the fibre segments to soften and fuse together. The heated fibres are then longitudinally drawn to cause each of the fused fibres to develop a biconical taper and to thereby form the coupler. A typical disclosure of these steps is to be found in Abebe U.S. Pat. No. 4,612,028.

SUMMARY OF THE INVENTION

It is an object of the invention to provide enhancements of the aforedescribed known technique for fabricating fibre optic couplers which will contribute to bettering existing commercial standards as to, for example, power loss and coupling factor tolerances. The present invention stems from the novel concept of continuously monitoring the tension in the optical fibres during the coupler fabrication process and controlling one or more process variables in response to specific observations of the tension. In accordance with the preferred practice of a first aspect of the invention, this facility is utilised to introduce and control an additional pre-heating step which enhances the condition of the fibres for subsequent fusion and drawing. Most generally, the invention provides in its first aspect a method of fabricating a fused fibre optic coupler, especially but not only a multi-mode biconical taper coupler, comprising:

pretreating respective segments of optical fibre to relieve torsional stress therein; and heating said pretreated segments while in intimate side-by-side contact to a temperature sufficient to cause the fibre segments to fuse together.

In preferred embodiments, the invention in its first aspect provides a method of fabricating a fused fibre optic coupler, especially but not only a multi-mode biconical taper coupler, comprising:

disposing two or more segments of optical fibre under longitudinal tension, preferably substantially identical tension;

preheating said tensioned fibre segments to a temperature sufficient to soften the segments and thereby substantially relieve said tension by inelastic stretching of the segments; and after the segments have cooled, re-tensioning the segments and heating them while in intimate side-by-side contact to a temperature sufficient to cause the fibre segments to fuse together.

It is believed that the initial heating step is useful in relieving torsional stress prior to the fusion heating. It is thought that pre-existing unrelieved torsional stress in the fibres contributes to unpredictable excessive power losses in the coupler and particularly to unpredictable excessive tolerances in its coupling factor.

Preferably, the longitudinal tension in the fibres is continuously or periodically monitored to detect when the tension falls substantially to zero during the preheating, whereupon the preheating is terminated and the fibre segments allowed to cool. The degree of cooling will be dependent on circumstances but cooling is not necessarily to ambient temperature. Cooling is more generally to an intermediate temperature above ambient.

Most preferably, the optical fibre segments are brought into said intimate contact by being twisted about each other.

In a second aspect, the invention affords a method of fabricating a fused fibre optic coupler comprising:

heating two or more initially tensioned segments of optical fibre while these segments are in intimate side-by-side contact;

monitoring the longitudinal tension and temperature of each of said segments, directly or indirectly; and when the tension in the segments falls to a predetermined threshold value, thereafter continuing to raise the temperature of the segments a predetermined number of degrees above their temperature when their tension fell to said threshold value, to a temperature sufficient to cause the fibre segments to fuse together.

The method preferably further includes thereafter holding or reducing the temperature of the segments, for example, to that at the predetermined tension threshold, and then longitudinally drawing the heated fibres to cause each of the fused fibres to develop a biconical taper and thereby form a coupler of this kind.

The invention also provides apparatus for fabricating a fused fibre optic coupler, comprising:

retaining means for disposing two or more segments of optical fibre under longitudinal tension;

means for heating said tensioned fibre segments; and control means connected for activating said heating means and said retaining means to preheat said tensioned fibre segments to a temperature sufficient to soften the segments and thereby substantially relieve said tension by inelastic stretching of the segments, and, after the segments have cooled, to re-tension the segments and heat them while in intimate side-by-side contact to a temperature sufficient to cause the fibre segments to fuse together.

Still further afforded by the invention is apparatus for fabricating a fused fibre optic coupler, comprising:

means for disposing two or more segments of optical fibre under longitudinal tension;

means for heating said tensioned fibre segments;

means for monitoring the longitudinal tension and temperature of each of said segments, directly or indirectly; and control means responsive to said monitoring means and connected for controlling said heating means, which control means is arranged whereby, when the tension in the segments falls to a predetermined threshold value, the heating means continues to raise the temperature of the segments a predetermined number of degrees above their temperature when their tension fell to said threshold value, to a temperature sufficient to cause the fibre segments to fuse together.

The control means in either of the arrangements just described is preferably a programmed computer control means.

It is found that the control of fusion heating in response to monitored fibre tension results in improved reliability of the method in terms of a closer uniformity of coupler parameters to standard or desired values. This is thought to occur because the tension in a fibre takes account of axial variations in the physical properties of the fibre, for example, viscosity, a dependency which is not achieveable by solely relying, for example, an observed furnace temperature, or even on fibre temperature. The optimum fusion temperature for given coupler characteristics indeed varies over a long length of fibre.

Monitoring of longitudinal tension in the fibres may be effected by means of any suitable stress or strain gauge. The gauge preferably interfaces to the above-mentioned computer programmed to control the fibre heating means in response to a relevant tension signal fed back from the gauge.

The longitudinal tension of each fibre may be separately monitored and controlled.

Most preferably, the optical fibre segments are brought into said intimate contact by being twisted about each other.

BRIEF DESCRIPTION OF THE DRAWINGS

The invention will now be further described, by way of example only, with reference to the accompanying drawings, in which.

BEST MODES FOR CARRYING OUT THE INVENTION

Figure 1:
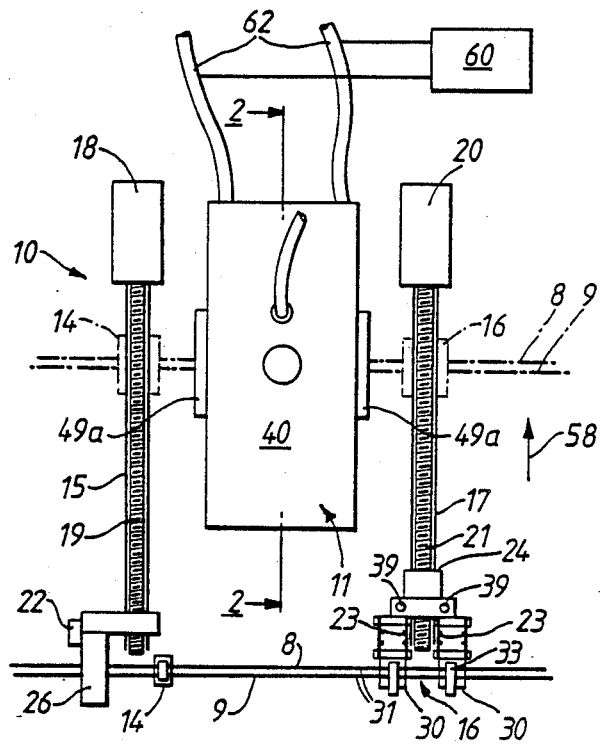
FIG. 1 is a purely schematic plan view of apparatus in accordance with the invention.

The illustrated apparatus 10 includes a heater assembly 11 with an elongate hollow tubular carbon furnace 12 (FIGS. 2 and 3); respective translateable clamp units 14, 16 which are linearly moveable perpendicular to the axis of furnace 12 by lead screw drives 19,21 on respective transverse slideways 15, 17; respective stepper motors 18, 20 operating the lead screw drives 19, 21; fibre drawing units 22, 24; devices 23 for measuring fibre tension; and a clamp rotater 26 associated with clamp unit 14.

Clamp units 14, 16, detailed further below, have respective platens 30, with grooves 31 which, in use of the apparatus, receive and locate a pair of optical fibres 8, 9 when they are extended between and securely held by the clamp units 14, 16, at an initial lateral spacing of 0.5 to 1.0 mm. The fibres are pressed and thereby clamped by hingeable padded plates 33. Clamp unit 14 is rotatable by drive 26 to subsequently twist the fibres about each other, for example, by one turn: clamps 14, 16 and drive 26 thereby constitute means to hold the fibres in intimate side-by-side contact. Drive 26 is designed to twist the fibres about each other without twisting the individual fibres, and is also detailed further below.

Drawing units 22, 24 are arranged to uniformly move clamp units 14, 16 oppositely away from each other parallel to the axis of furnace 12 and thereby serve to draw the fibres during the biconical formation step. They are employed to apply tension to the fibres during operation of the apparatus, in conjunction with tension monitoring devices 23 such as strain gauge bridges associated with clamp units 14, 16.

Figure 2:
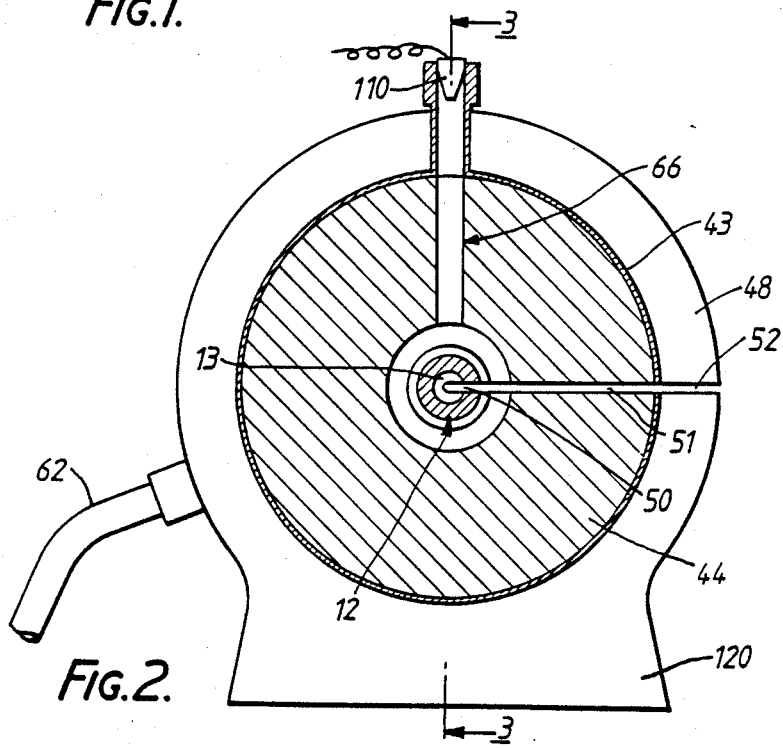
FIG. 2 is a lateral cross-section on the line 2—2 in FIG. 1, showing the heater assembly.
Figure 3:
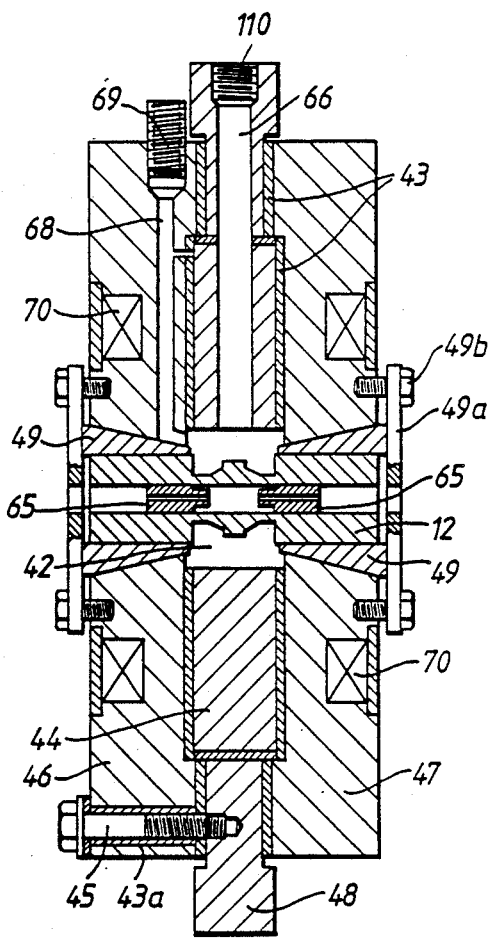
FIG. 3 is cross-section on the line 3—3 in FIG. 2 and depicts the furnace in greater detail.

Heater assembly 11 is illustrated in greater detail in FIGS. 2 and 3. It includes a housing 40 comprised of four principal parts: an annular heat insulating core 44, e.g. of graphite felt, a pair of larger annular electrodes 46, 47, and an outer mounting ring 48. Ring 48 extends about core 44, both being sandwiched between electrodes 46, 47, and is shaped to provide a stable pedestal 120 for the assembly (FIG. 2). This assembly is maintained by multiple screws 45 fastening the electrodes to ring 48, and the electrodes are wholly electrically insulated from each other, the core and the ring by suitable insulating shims and baffles 43, and by insulating sleeves 43a about screws 45.

Housing 40 defines at its centre a cavity 42 which receives furnace 12. The bores of electrodes 46, 47 are inwardly tapered to complement respective concical electrically conductive copper wedges 49 which firmly fix the furnace axially symmetrically in place. Wedges 49 are driven home and retained by end plates 49a held by screws 49b to the electrodes. Wedges 49 allow for thermal expansion of the furnace during heating.

Carbon furnace 12, a tube of solid and homogeneous graphite, is heated by an electrical current delivered from a suitable power supply 60 via the sheaths of coolant supply conduits 62. The current passes via one electrode 46 through the associated wedge 49, the furnace 12, the other wedge 49 and electrode 47.

The axis of furnace 12 is advantageously horizontal, as illustrated, rather than vertical, to prevent a "chimney" effect and consequent undesirable deposition of particles and other contaminants on the fibres.

The hollow interior cavity 13 of furnace 12 is of axially symmetrical circular cross-section and is laterally open to the space between clamp units 14, 16 by registered co-planar longitudinal slots 50, 51, 52 (FIG. 2) respectively in the furnace, in insulating core 44, and in the outer mounting ring 48. Cavity 13 is furthermore open ended and registers with apertures in end plates 49a so that there is a clear axial line of sight through the heater assembly.

Furnace 12 has a temperature profile in its internal cavity 13 that is substantially both axially symmetrical and longitudinally symmetrical about a centre point. The preferred temperature profile of the hollow interior exhibits a single peak, uniform temperature zone in the centre region of the furnace with steep downward gradients within a defined region greater than the centre region. Further detail is disclosed in applicant's co-pending international patent application PCT/AU87/00. The steepness of the gradients may be further enhanced by locating laterally slotted graphite plugs 65 in the bore of the furnace.

Assembly 11 has a transverse bore 66 to locate a pyrometer 110 (FIG. 2) to monitor the temperature of the fibres in furnace 12, as well as a duct 68 and port 69 for admitting a gas, for example an inert gas such as nitrogen, to cavity 42 and to the interior cavity 13 of the furnace during the heating and drawing steps. This gas is necessary for optimum operation of the graphite furnace, and may be periodically replaced as described above, by a gas such as methane for pyrolising the interior surface of the furnace. Electrodes 46, 47 are provided with internal coolant tubes, represented at 70, to which coolant is circulated via conduits 62.

Figure 4:
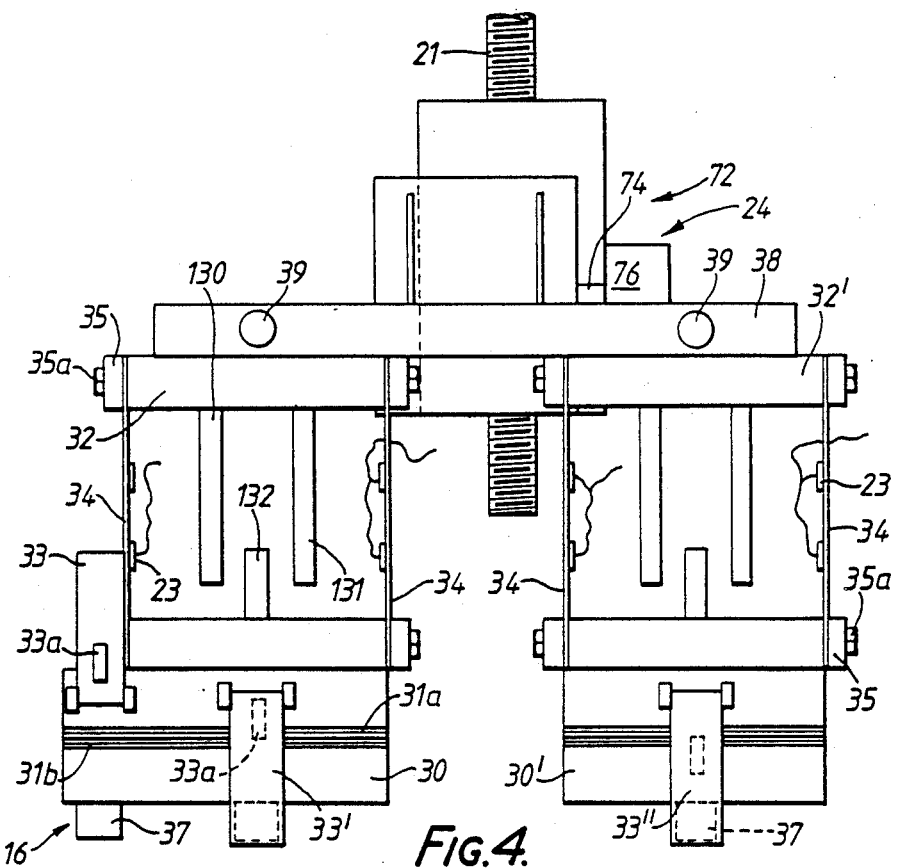
FIG. 4 is a plan view of the unit for clamping, tensioning and drawing the optical fibres.
Figure 5:
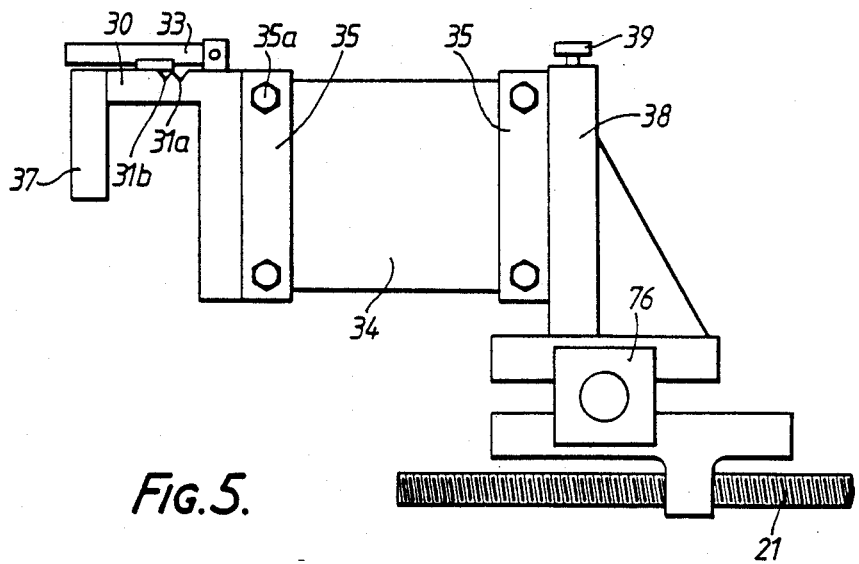
FIG. 5 is a side elevation of the unit of FIG. 4.

Clamp unit 16 is depicted in greater detail in FIGS. 4 and 5. A pair of platens 30, 30' with fibre grooves 31a, 31b are secured to respective mounting blocks 32, 32' by pairs of stainless steel shims 34. Shims 34 are held by cover strips 35 and screws 35a. Shims 34 are in vertical planes and carry the aforementioned strain gauge devices 23. Limits on the movement of platen 30 are provided by projecting detents 130, 131 on blocks 32, which engage an outstanding lug 132 on the platen.

Three hingeable padded steel plates 33, 33' and 33" are provided on platens 30, 30'. The pads 33a are positioned on the undersides of plates 33, 33' and 33" so that they respectively clamp both fibres and the two fibres separately. Plates 33, 33' and 33" are retained against the fibres by magnets 37. Fibre grooves 31a, 31b are V-grooves dimensioned to leave about half the fibre cross-section above the surface of the platen.

Blocks 32, 32' are mounted on a common backplate 38 for sliding movement parallel to the fibre direction. These sliding motions are effected by rotation of finger knobs 39 and are used to individually tension, or adjust the tension of, the respective fibres. The backplate 38 is part of a carriage 72 which is moveable uniformally on a lead screw 74 parallel to the fibres and on lead screw 21 perpendicular to the fibres. Lead screw 74 is driven by a motor 76 and these components thereby constitute drawing unit 24.

In use of the apparatus to fabricate a fused biconical taper fibre optic coupler, a pair of optical fibres 8, 9, for example multi-mode silica fibres of selected length with a germanium-doped core, are first stripped of their coating in respective segments to expose the cladding. The cladding is preferably etched by any suitable well know technique, e.g. immersion in a hydrofluoric acid bath, to reduce the cladding thickness in all or part of these segments. The fibres are then cleaned, for example, in a methanol bath or sponge, and securely held under prescribed substantially identical tension, e.g. 200kPa, by clamp units 14, 16 in front of and in line with slot 52.

Stepper motors 18, 20 are then activated to rotate lead screws 19, 21 and thereby move clamps 14, 16 at equal speeds in slideways 15, 17, in the direction indicated by arrow 58, to move the fibres through slots 52, 51, 50 to the centre of furnace cavity 13. This position is shown by dot-dash lines in FIG. 1: the centre of the fibre segments should desirably be at the centre of the longitudinal temperature profile of the furnace cavity.

The furnace is now activated and heat is applied to the etched segments to raise their temperature sufficiently to soften the segments and thereby substantially relieve the tension in the segments by inelastic stretching of the segments. The temperature is increased until the longitudinal tension, continuously monitored by strain gauge devices 23, falls substantially to zero.

At zero fibre tension, the heater is disabled and the fibre segments allowed to cool to a predetermined lower temperature, monitored by pyrometer 110. Thereafter the segments are re-tensioned to a value similar to the first tensioning, by temporarily activating drawing units 22, 24, and lightly twisted about each other in intimate side-by-side contact by operating rotater 26.

The twisted contacted segments were then heated for a second time to a temperature sufficient to cause the fibre segments to soften and fuse together in a manner well known per se, over a fusion length of, e.g., about 1 cm. The temperature required is in excess of 1600° C. The maximum heating temperature is determined by monitoring fibre tension. When the tension falls to, for example 0.4, of its initial value, the temperature of the segments is thereafter raised by a further number of degrees, for example 250° C., above their temperature when the tension fell to 0.4 of its initial value.

Drawing units 22, 24 are activated during the fusion step to draw the fibres in opposite directions at a relatively slow rate, for example 1 to 4 mm per minute with a 1 cm fusion length, to minimise sag sufficiently to preclude the optical fibres from contacting the surface of furnace cavity 13 or other adjacent features. Strain gauge devices 23 are employed to ensure that adequate fibre tension is maintained.

During this process, light is preferably being transmitted through one of the optical fibres from one end, and monitored at the other end of each fibre. It is then possible to continuously monitor the coupling factor and excess power loss. When the coupling factor is observed to reach, for example about 2%, fusion is deemed to be complete and the drawing rate is increased substantially, for example to 7 or 8 mm per minute: this is effective to cause the fused fibres to develop a biconical taper in the known fashion. Heating and drawing are stopped in a controlled fashion in order to achieve the desired coupling factor. Typically the waist of the coupler will be 30 microns wide for original etched fibres of diameter 80 to 90 microns each. During the faster draw, it may be desirable to lower the furnace temperature. The biconical taper coupler can now be packaged and/or encapsulated in accordance with techniques known per se to render it resistant to hostile environments, as well as robust and shock resistant.

Figure 6:
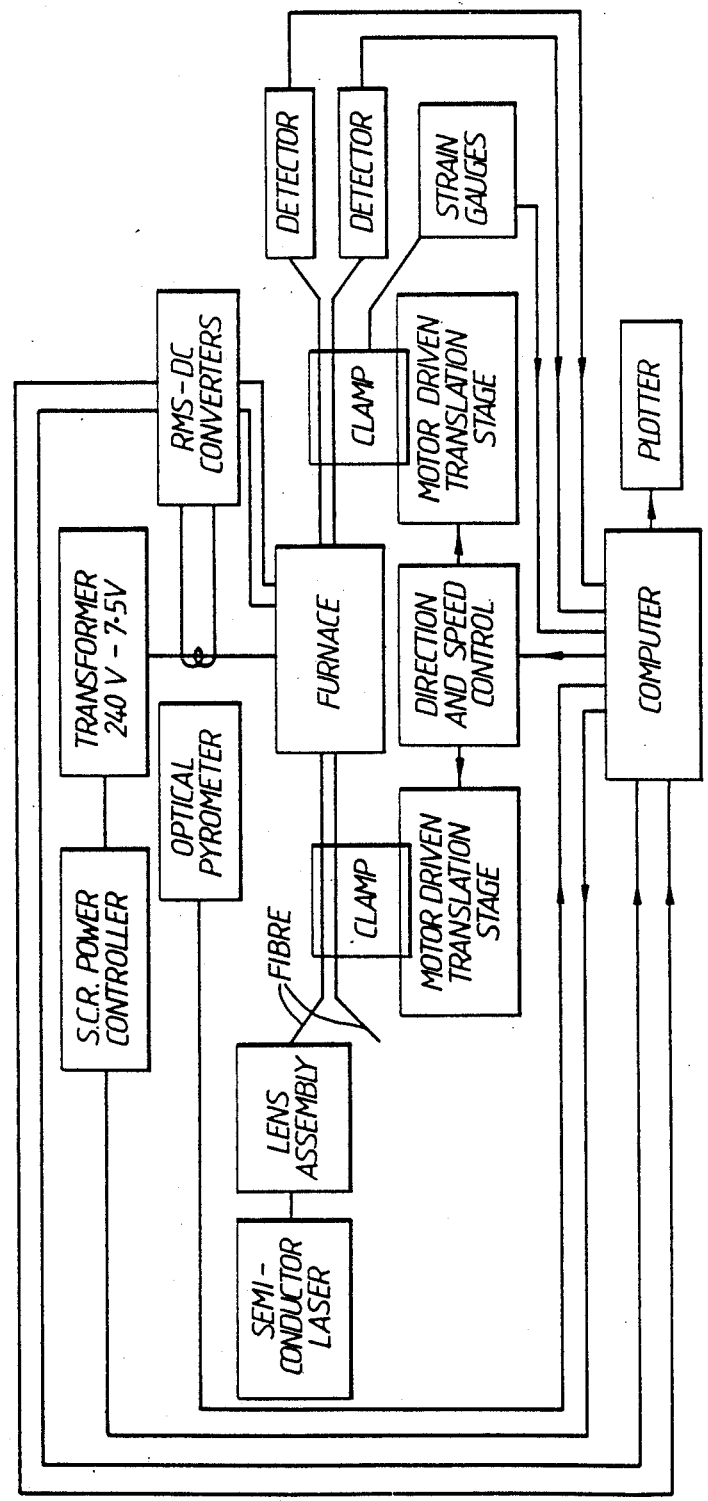
FIG. 6 is a block diagram of the computer, control arrangement for the apparatus of FIG. 1.

FIG. 6 is a block diagram of a computer-controlled arrangement for carrying out the above steps wholly automatically once the fibres are clamped in place. A particular task for the computer is to apply the different heating stages which are a notable preferred feature of the invention.

We claim:

1. A method of fabricating a fused optic coupler, comprising:
    pretreating respective segments of at least a first and a second optical fibre to relieve torsional stress therein for a first predetermined time period; and
    heating for a second predetermined time period said pertreated segments while in intimate side-by-side contract to a temperature sufficient to cause the fibre segments to fuse together, wherein said first predetermined time period precedes said second predetermined time period.

2. A method of fabricating a fused fibre optic coupler, comprising:
    disposing two or more segments of optical fibre under longitudinal tension;
    preheating said tensioned fibre segments to a temperature sufficient to soften the segments and thereby substantially relieve said tension by inelastic stretching of the segments; and
    after the segments have cooled, re-tensioning the segments and heating them while in intimate side-by-side contact to a temperature sufficient to cause the fibre segments to fuse together.

3. A method according to claim 2 wherein the longitudinal tension in the fibres is continuously or periodically monitored to detect when the tension falls substantially to zero during the preheating, whereupon the preheating is terminated and the fibre segments allowed to cool.

4. A method according to claim 2 or 3 wherein the optical fibre segments are brought into said intimate contact by being twisted about each other.

5. A method according to claim 2, or 3 for fabricating a fused biconical taper fibre optic coupler, further comprising longitudinally drawing the heated fibres during said heating step to cause each fused fibre to develop a biconical taper.

6. A method according to claim 2 or 3 further comprising;
during said heating monitoring the longitudinal tension and temperature of each of said segments, directly or indirectly, and
when the tension in the segments falls to a predetermined threshold value, thereafter continuing to raise the temperature of the segments a predetermined number of degrees above their temperature when their tension fell to said threshold value, to a temperature sufficient to cause the fibre segments to fuse together.

7. A method according to claim 6 for fabricating a fused biconical taper fibre optic coupler, comprising:
thereafter holding or reducing the temperature of the segments, for example to that at the predetermined tension threshold, and then longitudinally drawing the heated fibres to cause each of the fused fibres to develop a biconical taper and thereby form the coupler.

8. A method of fabricating a fused fibre optic coupler, comprising:
heating two or more initially tensioned segments of optical fibre while these segments are in intimte side-by-side contact;
monitoring the longitudinal tension and temperature of each of said segments, directly or indirectly, and
when the tension in the segments falls to a predetermined threshold value, thereafter continuing to raise the temperature of the segments a predetermined number of degrees above their temperature when their tension fell to said threshold value, to a temperature sufficient to cause the fibre segments to fuse together.

9. A method according to claim 8 for fabricating a fused biconical taper fibre optic coupler, comprising:
thereafter holding or reducing the temperature of the segments, for example to that at the predetermined tension threshold, and then longitudinally drawing the heated fibres to cause each of the fused fibres to develop a biconical taper and thereby form the coupler.

10. A method according to claim 8 or 9 wherein the optical fibre segments are brought into said intimate contact by being twisted about each other.

11. Apparatus for fabricating a fused fibre optic coupler, comprising:
retaining means for disposing two or more segments of optical fibre under longitudinal tension;
means for heating said tensioned fibre segments; and
control means connected for activating said heating means and said retaining means to preheat said tensioned fibre segments to a temperature sufficient to soften the segments and thereby substantially relieve said tension by inelastic stretching of the segments, and, after the segments have cooled, to re-tension the segments and heat them while in intimate side-by-side contact to a temperature sufficient to cause the fibre segments to fuse together.

12. Apparatus according to claim 11 further comprising means for monitoring the longitudinal tension in the fibres, said control means being responsive to the detection of a fall in the tension substantially to zero during said preheating, to terminate said preheating and allow the fibre segments to cool.

13. Apparatus according to claim 11 or 12 further comprising:
means for longitudinally drawing the heated fibres during said heating step to cause each fused fibre to develop a biconical taper.

14. Apparatus according to claims 11 or 12 wherein said control means is a programmed computer control means.

15. Apparatus for fabricating a fused fibre optic coupler, comprising:
means for disposing two or more segments of optical fibre under longitudinal tension;
means for heating said tensioned fibre segments;
means for monitoring the longitudinal tension and temperature of each of said segments, directly or indirectly; and
control means responsive to said monitoring means and controlling said heating means which control means is arranged whereby, when the tension in the segments falls to a predetermined threshold value, the heating means continues to raise the temperature of the segments a predetermined number of degrees above their temperature when their tension falls to said threshold value, to a temperature sufficient to cause the fibre segments to fuse together.

16. Apparatus according to claim 15 further comprising means for longitudinally drawing the heated fibres during said heating step to cause each fused fibre to develop a biconical taper.

17. Apparatus according to claims 15 or 16 wherein said control means is a programmed computer control means.

* * * * *